(12) United States Patent
Jiang et al.

(10) Patent No.: US 8,873,600 B2
(45) Date of Patent: Oct. 28, 2014

(54) SYSTEM AND METHOD FOR HIGH ACCURACY GAS REFILL IN A TWO CHAMBER GAS DISCHARGE LASER SYSTEM

(75) Inventors: Rui Jiang, San Diego, CA (US); Joshua Jon Thornes, San Diego, CA (US); Daniel Jason Riggs, San Diego, CA (US); Kevin Michael O'Brien, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 632 days.

(21) Appl. No.: 13/174,484

(22) Filed: Jun. 30, 2011

(65) Prior Publication Data

US 2013/0000773 A1  Jan. 3, 2013

(51) Int. Cl.
*H01S 3/22* (2006.01)
*H01S 3/223* (2006.01)
*H01S 3/036* (2006.01)

(52) U.S. Cl.
CPC .. *H01S 3/036* (2013.01); *H01S 3/22* (2013.01)
USPC .............................................. 372/59; 372/55

(58) Field of Classification Search
USPC .......................................... 372/55, 57, 58, 59
See application file for complete search history.

(56) References Cited

U.S. PATENT DOCUMENTS

| | | | |
|---|---|---|---|
| 6,690,704 | B2 | 2/2004 | Fallon et al. |
| 2004/0022293 | A1 | 2/2004 | Rule et al. |
| 2005/0094698 | A1 | 5/2005 | Besaucele et al. |
| 2008/0130701 | A1 | 6/2008 | Den Hurk |
| 2008/0205472 | A1 | 8/2008 | Dunstan et al. |

*Primary Examiner* — Armando Rodriguez
(74) *Attorney, Agent, or Firm* — Gard & Kaslow LLP

(57) ABSTRACT

Systems and methods for automatically performing a high accuracy gas refill in a laser chamber of a two chamber gas discharge laser such as an excimer laser are disclosed. Based upon a target pressure and halogen concentration that is either predetermined or entered by a user, and with no further user action, a non-halogen containing gas is added to the chamber to a first pressure, followed by the addition of halogen containing gas to a second pressure which is greater than a target pressure for the chamber, such that the halogen content in the gas at the second pressure is at a desired concentration. The gas in the chamber is bled until the pressure drops to the target pressure. The amount of non-halogen containing gas added is estimated automatically, and the amount of halogen containing gas is measured so that the desired concentration is obtained, taking into account both temperature and any gas remaining in the fill pipes from prior laser operation.

25 Claims, 3 Drawing Sheets

SYSTEM AND METHOD FOR HIGH ACCURACY GAS REFILL IN A TWO CHAMBER GAS DISCHARGE LASER SYSTEM

FIELD OF THE INVENTION

The present invention relates generally to laser systems. More specifically, the invention relates to performing refills of the gas in the chambers of a gas discharge laser, such as a two chamber Master Oscillator-Power Amplifier excimer laser.

BACKGROUND OF THE INVENTION

One type of gas discharge laser used in photolithography is known as an excimer laser. An excimer laser typically uses a combination of a noble gas, such as argon, krypton, or xenon, and a reactive gas such as fluorine or chlorine. The excimer laser derives its name from the fact that under the appropriate
• conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and the laser continues to function properly.

One way to do this is with a full replenishment of the gas in the chambers, called a refill, where all of the gas is replaced while the laser is not firing to return the gas content in the chamber to the desired mix, concentration and pressure. However, refills are extremely disruptive as the laser be shut off during the refill process, and thus the lithographic exposure of chips must also be paused in a controlled manner at the same time and then restarted when the laser is again operational to avoid improper processing of the chips. For this reason, it is typical to refill both chambers at once to save time, although this is not necessary.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One why of doing this is by performing a partial replenishment of the gas in the chambers, known as an inject, rather than a full refill. As long as the laser is able to continue to operate within certain parameters, it is not necessary to shut the laser down for the inject, and thus processing of chips may continue during the inject process. However, the performance of the laser still tends to change over time in such a way that injects become inadequate to compensate, and so refills are still performed at regular intervals.

In a refill operation, the remaining gas in the laser chambers is evacuated, and then new gas is introduced into the chambers in an amount intended to arrive at a particular pressure and concentration of fluorine. (This may be followed by an optimization process, in which the laser is then test-fired to determine its operating parameters. If the laser is not operating within the desired parameters, the gas in the chambers is adjusted, and another test done. This is repeated until the desired parameters are obtained.)

However, it is difficult to achieve accurate refills, for two main reasons. First, refills are generally based solely on pressure, and do not measure or compensate for variations in temperature which can result in significant variations in the final pressure in the laser chambers. Second, refill protocols and algorithms typically only consider the laser chamber volumes and do not take into account the gas that is present in the pipes between the gas tanks and the laser chambers. The gas in the pipes is pushed into the laser chambers during refills and injects, but the effect of this on the actual partial concentrations of the gases in the chambers has traditionally been ignored. Current processes may also use more gas than is necessary, as gas is added to and released from the chambers until a satisfactory gas condition is achieved.

A more accurate refill would mitigate or eliminate many or all of these issues, and allow the laser to operate for a longer period of time before another refill and/or an inject must be performed. Further, an accurate refill provides a better basis on which to base the calculation of subsequent injects to the laser chambers. It is thus desirable that refills be performed in a fashion that results in a highly accurate concentration of gasses.

SUMMARY OF THE INVENTION

A system and method for automatically and accurately performing refills of the gas in the chambers of a two chamber gas discharge laser such as a MOPA excimer laser is disclosed. Control of the refill process is based upon calculation of the actual amount of gas added to the chambers according to gas equations, rather than merely the pressure of the gas as in the prior art. The impact of both temperature variation and the pipe line volume is also considered by the use of such equations. By allowing for these factors, refills may be performed significantly more accurately than with the process of the prior art, and potentially with the use of less gas.

In one embodiment, a dual chamber gas discharge laser light source is described, comprising a master oscillator and an amplifier, each of the master oscillator and amplifier having a laser chamber containing a lasing medium gas comprising a halogen, and a gas refill system including a controller automatically executing a refill scheme at regular intervals, the refill scheme comprising: obtaining a target pressure and concentration of halogen for a selected one of the laser chambers; evacuating the selected laser chamber to a first point at which the gas pressure in the chamber reaches a predetermined low value, and measuring the temperature and pressure at the first point; adding an amount of non-halogen containing gas to the selected laser chamber to reach a second point and measuring the temperature and pressure at the second point; adding an amount of halogen containing gas to the selected laser chamber such that the gas in the selected laser chamber reaches a desired halogen concentration at a pressure greater than the target pressure; and bleeding gas from the selected laser chamber until the target pressure is reached.

In another embodiment, a method of refilling gas in a dual chamber gas discharge laser light source having a master oscillator and an amplifier is described, each of the master oscillator and amplifier having a laser chamber containing a lasing medium gas comprising a halogen, the method comprising the steps of: obtaining a target pressure and concentration of halogen for a selected one of the laser chambers; evacuating the selected laser chamber to a first point at which the gas pressure in the chamber reaches a predetermined low value, and measuring the temperature and pressure at the first point; adding an amount of non-halogen containing gas to the selected laser chamber to reach a second point and measuring the temperature and pressure at the second point; adding an amount of halogen containing gas to the selected laser chamber such that the gas in the selected laser chamber reaches a desired halogen concentration at a pressure greater than the target pressure; and bleeding gas from the selected laser chamber until the target pressure is reached.

Still another embodiment discloses a non-transitory computer-readable medium having embodied thereon a program, the program being executable by a processor to perform a method of automatically refilling the gas in a laser chamber of a dual chamber gas discharge laser light source having a master oscillator and an amplifier, each of the master oscillator and amplifier having a laser chamber containing a lasing medium gas comprising a halogen, the method comprising the steps of: obtaining a target pressure and concentration of halogen for a selected one of the laser chambers; evacuating the selected laser chamber to a first point at which the gas pressure in the chamber reaches a predetermined low value, and measuring the temperature and pressure at the first point; adding an amount of non-halogen containing gas to the selected laser chamber to reach a second point and measuring the temperature and pressure at the second point; adding an amount of halogen containing gas to the selected laser chamber such that the gas in the selected laser chamber reaches a desired halogen concentration at a pressure greater than the target pressure; and bleeding gas from the selected laser chamber until the target pressure is reached.

DETAILED DESCRIPTION OF THE INVENTION

The present application describes a method and system for automatically and accurately performing refills of the gas in the chambers of a two chamber gas discharge laser such as a MOPA excimer laser. It is expected that an automated refill process will result in increased accuracy and mitigate or eliminate many of the issues associated with previous refills. Control of the refill process is based upon calculation of the amount of gas added to the chambers according to gas equations using both temperature and pressure, rather than merely relying on the pressure of the gas, and thus also takes into account the impact of temperature variations. The described process also takes gas left over in the pipe line volume into account. By allowing for these factors in the process, refills may be performed significantly more accurately than with the processes of the prior art, and possibly with the use of less gas.

Figure 1:
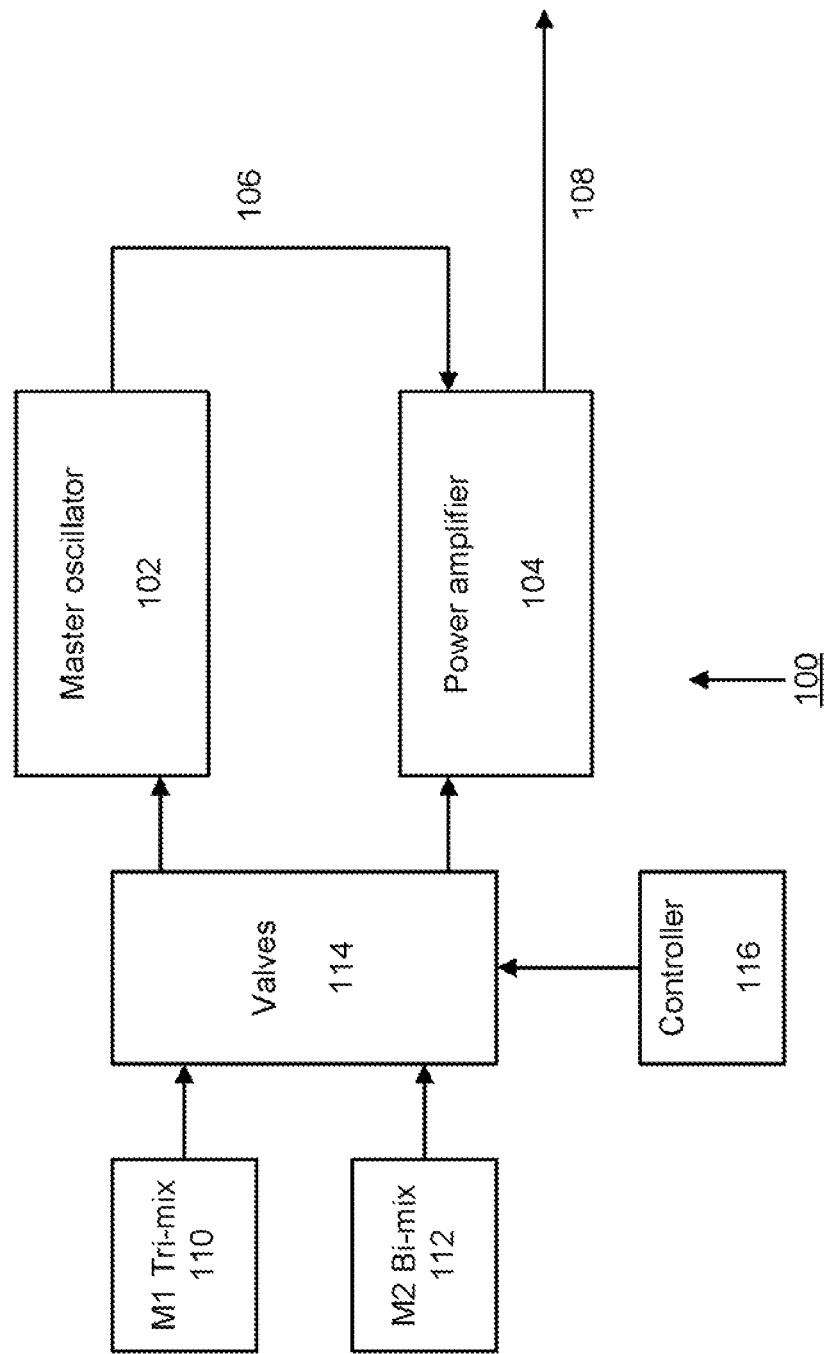
FIG. 1 shows a simplified block diagram of an automatic gas refill system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner machine (not shown) for use in lithography.

Each laser chamber contains a mixture of gases; for example, in a given excimer laser each laser chamber might contain a halogen, e.g., fluorine, along with other gases such argon, neon, and possibly others in different partial pressures that add up to a total pressure P. Gas bottles 110 and 112 are connected to the master oscillator 102 and power amplifier 104 through valves 114 to allow for replenishment of the gas in the laser chambers when desired. Gas bottle 110 typically might contain a mixture of gases including fluorine, argon and neon, known as an "M1 mix" or "tri-mix," while gas bottle 112 might contain a mixture of argon, neon and/or other gases, but no fluorine, known as an "M2 mix" or "bi-mix." A controller 116, such as a processor or logic circuit, operates the valves 114 to transfer gases from bottles 110 and 112 into the laser chambers of the master oscillator 102 and power amplifier 104 based upon certain data as described further herein.

As is known in the art, two bottles of gas are needed, since the fluorine in gas bottle 110 is at a particular partial pressure that is typically higher than that desired for laser operation. In order to add the fluorine to the laser chamber of the master oscillator 102 or power amplifier 104 at a desired lower partial pressure, the gas in bottle 110 must be diluted, and the non-halogen containing gas in bottle 112 is used for this purpose.

Although not shown, valves 114 typically include two valves for each laser chamber, an "injection" valve that allows gas to pass into and out of each chamber at a first rate, and a "chamber fill" valve that allows gas to pass into and out of each chamber at a second, and faster, rate. In addition, the laser chambers in the master oscillator 102 and power amplifier 104 contain blowers for mixing the gases that are in the chambers so that a homogenous mixture is maintained during operation. The blowers also add heat to the gas.

When an engineer performs a manual refill, the engineer must estimate the amount of bi-mix and tri-mix to add to the laser chambers to arrive at the desired total pressure and fluorine concentration for each chamber. In general, different pressures are used for operation of the Master Oscillator chamber and the Power Amplifier chamber, although the fluorine concentration is typically about the same in each chamber. Such estimates are readily made from the concentration of fluorine in the tri-mix, and the pressures of the bi-mix and tri-mix. For example, if the fluorine concentration in the tri-mix is three times the concentration desired in the chambers, then twice as much bi-mix must be used as tri-mix so that the fluorine concentration in the chambers is reduced by two-thirds, with the total amount of gas for each chamber calculated to provide the desired operating pressure for that chamber given the volume of the chamber. Such calculations are well known in the art.

Figure 2:
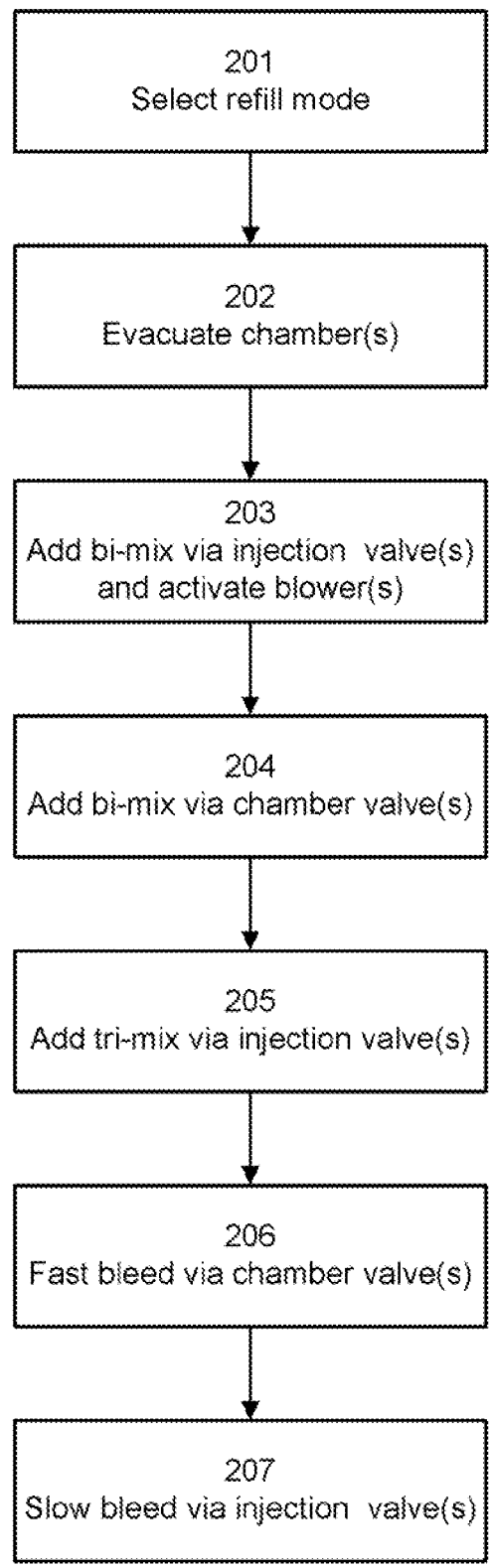
FIG. 2 is a simplified flow chart showing the steps of a method of an automatic gas refill of a chamber of a dual chamber gas laser, such as a MOPA excimer laser, according to one embodiment.
Figure 3:
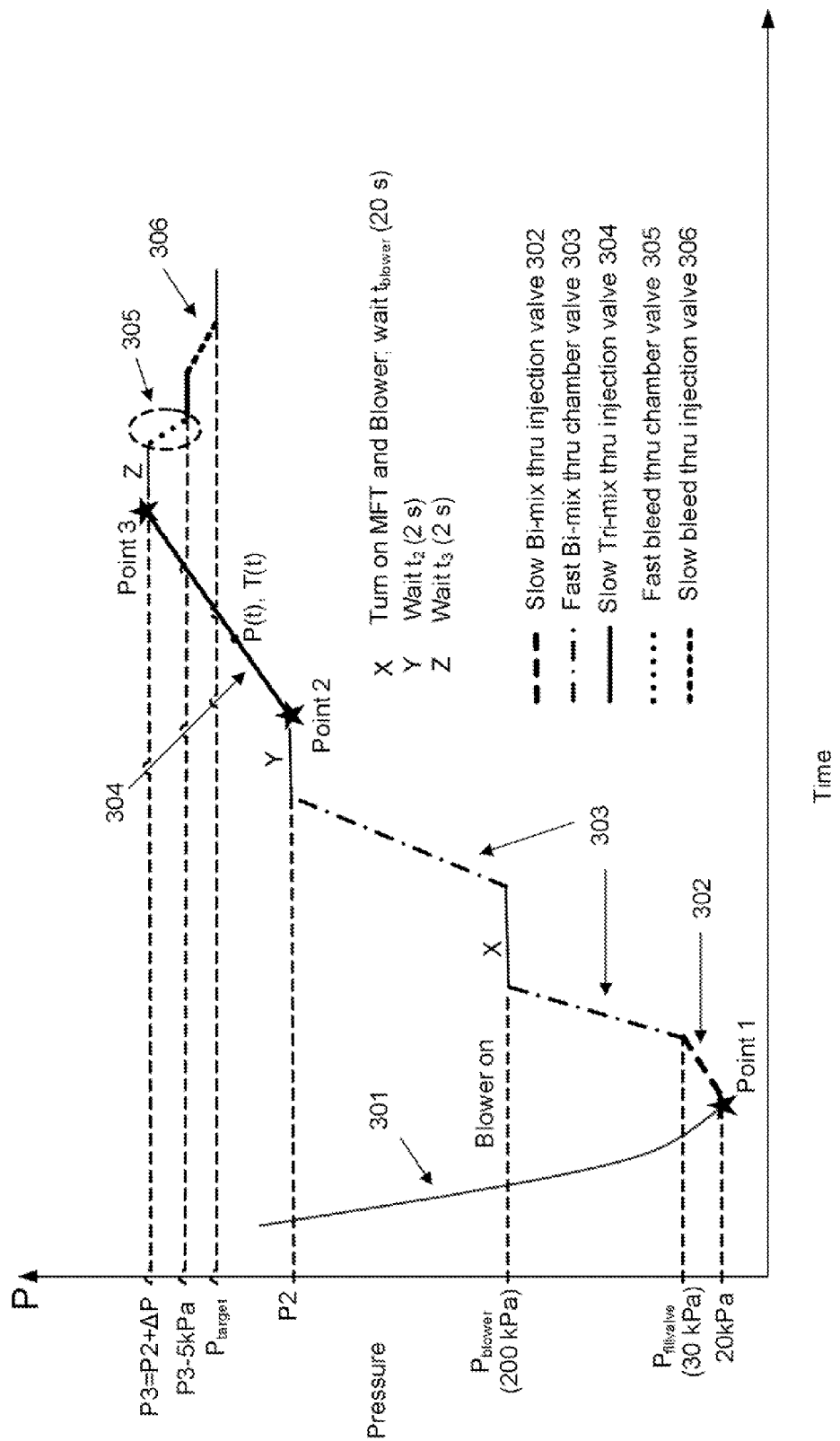
FIG. 3 is a graph showing the gas pressure over time in the chambers of a dual chamber gas laser, such as a MOPA excimer laser, during an automatic gas refill process in one embodiment.

An automated refill process is now described with reference to FIGS. 2 and 3. FIG. 2 is a simplified flow chart showing the steps of a method of a gas refill of the chambers of a dual chamber gas laser, such as a MOPA excimer laser, according to one embodiment. FIG. 3 is a graph showing the gas pressure over time in the chambers during the steps shown in FIG. 2. Various values stated herein are those used with certain MOPA lasers from Cymer, Inc., of San. Diego, Calif., although many other lasers will use similar values. One of skill in the art will be able to apply the principles described herein to excimer lasers from other manufacturers.

The pressure and temperature in the chambers is measured at various points during the refill process; in some embodiments, the pressure and temperature may be measured continuously. As will be discussed below, these measurements are used to obtain a high level of accuracy in the concentrations of gas in the chambers. The method is typically implemented in software, running on a processor, such as controller 116 in FIG. 1, which receives certain parameters including the measurements of the temperature and pressure in the chambers as inputs and controls operation of the valves.

At step 201, a refill mode is selected. This includes a selection of whether both chambers are to be refilled, or which chamber is to be refilled, as well as various pressure targets described below. In the following discussion, it is assumed that both chambers are being refilled at the same time, as is typically done to save downtime of the laser, although as with manual refills the chambers may be refilled separately. Simultaneous refill may be set as a default selection in the software if desired.

In addition, a target pressure $P_{target}$ and target concentration of fluorine are selected for each of the laser chambers; with the exception that these values may be different for the two chambers, the process for each chamber follows the same steps described below. While these may vary slightly for different lasers, as above they may have similar values for many MOPA excimer lasers. In one embodiment, these values are preset by the laser manufacturer to expected preferred values, so that the user need not change them. In some embodiments, the software may allow the values of the target pressure and concentration to be determined by the laser user (typically a chip manufacturer). The software also contains data regarding the concentration of fluorine in the tri-mix, chamber volumes, and the volumes of the fill pipes.

From this information, the software calculates the amount of bi-mix and tri-mix that should be added to each chamber to obtain the desired fluorine concentration at a pressure P3 that is slightly above the target pressure for each chamber; in one embodiment, P3 is approximately 10 kilopascals (kPa) above the target pressure, although this may be varied if desired. Again, such calculations are well known in the art; however, rather than requiring an engineer to perform such calculations and take action based upon them, the software does the calculations automatically and uses the results to perform the following steps.

Next, at step 202, the chambers are evacuated so that the pressure reaches a predetermined low value, for example, approximately 20 kPa in one embodiment. This is represented by the line portion 301 of the graph of pressure in FIG. 3. At point 1, the end of the evacuation, the pressure P1 and temperature T1 are measured and recorded. (In some embodiments, pressure and temperature are continuously measured, and this is recommended both for ease and to avoid missing certain points as will be described; however, if desired sensors may be turned on and off at appropriate times.)

Once the chambers have been evacuated, at step 203 bi-mix gas is added to the chamber slowly through the injection valves, until a pressure $P_{fillvalve}$ that is great enough to allow use of the chamber valves is reached, as shown by line portion 302 on FIG. 3. In one embodiment, this $P_{fillvalve}$ is approximately 30 kPa.

Next, at step 204, more bi-mix gas is added to the chambers more quickly through the chamber fill valves, as shown by the two line portions 303 on FIG. 3. During this step, the addition of gas is paused for a time (labeled "X" on FIG. 3) by closing the chamber fill valves when the pressure reaches a value $P_{blower}$, and the blowers are turned on for a period of time to mix the gas and bring its temperature close to a target value.

In one embodiment as shown on FIG. 3, this occurs when the pressure reaches a sufficiently high level, approximately 200 kPa, and the blowers are turned on for approximately 20 seconds, but in any event for a period of time long enough to thoroughly mix the gas in the chambers. This is done so that the gas in the chambers will be homogenous in order to insure the accuracy of the calculations of the gas equations as will be described below. (A metal fluoride trap in each chamber is typically turned on at this time as well.) The blowers typically remain on after this, but this is not required; however, the blowers should be on for subsequent temperature measurements for the same reason.

Once the gas has been mixed, the chamber fill valves are reopened, and addition of the bi-mix gas resumes until the calculated amount of bi-mix for each chamber has been added to that chamber. Once addition of the bi-mix is complete, after a slight pause (in one embodiment approximately 2 seconds) to allow for transients, at point 2 on FIG. 3 the actual pressure P2 and temperature T2 are again measured.

In some embodiments it might be possible to add the bi-mix in a single step, rather than slowly at first as in step 203 and then more quickly in step 204. However, it is believed that adding bi-mix quickly to a chamber having a sufficiently low pressure may stir up dust and impair later steps of the refill process and/or operation of the laser, and thus adding bi-mix in two steps as described is recommended.

The halogen containing tri-mix gas is then added at step 205, as shown by line portion 304 on FIG. 3. While as above an expected pressure P3 is calculated based upon the target pressure, for purposes of accuracy, rather than merely relying on the value of P3, the pressure and temperature are measured until tri-mix gas has been added in an amount calculated to provide the desired concentration of halogen gas as explained further below. The tri-mix gas is added slowly, through the injection valves, until point 3 is reached as explained below. As above, point 3 will have a pressure that is close to the value of P3, and slightly above the target pressure.

Because the target ratio between the bi-mix and tri-mix has been previously calculated, and with the use of the equations described below, the fluorine concentration will now be the target concentration to a high degree of accuracy. It is for this reason that enough gas is added to reach the pressure P3 which is slightly above the target pressure, so that gas may be bled from the chambers until the target pressure is obtained without changing the fluorine concentration of the gas in the chambers.

At step 206, as shown by line portion 305 in FIG. 3, the gas pressure in each chamber is first reduced by a fast bleed of gas from the chambers by opening the chamber valves. In one embodiment, the chamber valves are opened for a short predetermined amount of time, which will thus also reduce the pressure in the chambers by a certain amount based upon the flow rate of the open chamber valves. For example, opening the chamber valves for about half a second in some lasers may reduce the pressure in the chambers by approximately 5 kPa.

At step 207, a slower bleed of gas from the chambers continues through the injection valve, while monitoring the pressure in the chambers, until the desired pressure $P_{target}$ is reached, as shown by line portion 306 on FIG. 3. At this point, the chambers will have both the desired fluorine concentration and target pressure.

It may be possible that in some embodiments, steps 206 and 207, the fast and slow bleed of gas, may be combined into a single bleed. However, if only a fast bleed is used, there is a risk that the pressure will decrease to below the target pressure, while the use of only slow bleed will take longer to reach the target pressure. The use of a fast bleed for a portion of the bleed process, followed by a slow bleed, avoids the risk of overshooting the target pressure while saving time.

Further detail on step 205, the addition of the tri-mix and the reaching of point 3, is now provided. In order to achieve the desired high accuracy in determining how much gas should be added to the chambers, rather than merely relying on pressure as is typical in the prior art, the number of moles of gas added is calculated, which again involves monitoring the temperature as well as the pressure in the chambers. Further, the gas remaining from the previous gas life must be taken into account.

The following values are defined:

| | |
|---|---|
| $P_n$ | Pressure at point $n$ |
| $V_c$ | Volume of chamber |
| $V_p$ | Volume of pipe |
| $n_{F2}$ | Moles of tri-mix (1% $F_2$) |
| $n_{Bi}$ | Moles of bi-mix (Ar-Ne) |
| k | Gas Constant |
| $T_n$ | Temperature at point $n$ |
| r | Ratio of tri-mix in chamber gas at end of previous gas life (nominally 0.1) |

When the chambers have been evacuated in step 202 of FIG. 2, i.e., at point 1 in FIG. 3, the small amount of gas in the chambers (as above at a pressure of approximately 20 kPa) is that from the previous gas life, i.e., after operation of the laser from the previous refill and any subsequent injects. In addition, some gas remains in the fill pipes, which will be pushed into the chambers as new gas is introduced from the tanks in the refill process.

As above, the actual pressure and temperature at point 1 are measured. The number of moles of tri-mix gas at point 1 is given by:

$$rP_1(V_c + V_p) = n_{F2,1}kT_1 \text{ or}$$

$$n_{F2,1} = \frac{rP_1(V_c + V_p)}{kT_1}$$

Similarly, the number of moles of bi-mix gas at point 1 is given by:

$$(1-r)P_1(V_c + V_p) = n_{Bi,1}kT_1 \text{ or}$$

$$n_{Bi,1} = \frac{(1-r)P_1(V_c + V_p)}{kT_1}$$

The total amount of gas in a chamber and the pipe leading to the chamber at point 1 is thus:

$$n_1 = n_{F2,Point1} + n_{Bi,Point1}$$

$$= \frac{P_1(V_c + V_p)}{kT_1}$$

After this, as described above, bi-mix is added to the chambers at steps 203 and 204 of FIG. 2. Again, the gas in the pipe is pushed into the chamber as this is done. The total amount of gas in the chamber after step 204, i.e., at point 2 on FIG. 3, and then the number of moles of bi-mix, is determined by:

$$P_2 \cdot (V_c + V_p) = (n_1 + n_{Bi,2})kT_2$$

$$n_{Bi,2} = \left(\frac{P_2}{T_2} - \frac{P_1}{T_1}\right)\frac{V_c + V_p}{k}$$

As above, after the bi-mix has been added, pure tri-mix is added to the chamber in step 205 of FIG. 2. Note that after the tri-mix is added, the next operation is a gas bleed, step 206 of FIG. 2, which occurs through the fill line. Thus, only the addition of the tri-mix which is in the chamber should be counted. The gas state equation for the addition of tri-mix to the chamber at point 3 is:

$$n_{F2,Point3inchamber} = \left(\frac{P_3}{T_3} - \frac{P_2}{T_2}\right)\frac{V_c}{k}.$$

The total tri-mix concentration a in the chamber at point 3 on FIG. 3 is then:

$$a = \frac{n_{F2,point1} + n_{F2,point3inchamber}}{n_1 + n_{F2,point3inchamber} + n_{bi,point2}} \quad \text{(Equation 1)}$$

$$= \frac{\frac{rP_1(V_c + V_p)}{kT_1} + \left(\frac{P_3}{T_3} - \frac{P_2}{T_2}\right)\frac{V_c}{k}}{\frac{P_1(V_c + V_p)}{kT_1} + \left(\frac{P_2}{T_2} - \frac{P_1}{T_1}\right)\frac{V_p + V_c}{k} + \left(\frac{P_3}{T_3} - \frac{P_2}{T_2}\right)\frac{V_c}{k}}$$

or:

$$a = \frac{\frac{rP_1}{T_1}\left(1 + \frac{V_p}{V_c}\right) + \frac{P_3}{T_3} - \frac{P_2}{T_2}}{\frac{P_1}{T_1}\cdot\left(1 + \frac{V_p}{V_c}\right) + \frac{P_3}{T_3} - \frac{P_2}{T_2}}$$

A value γ is then defined such that:

$$\gamma \equiv \left[\frac{P_2}{T_2} + \frac{1}{1-a}\left(a\frac{P_2}{T_2} - r\frac{P_1}{T_1}\right)\left(1 + \frac{V_p}{V_c}\right)\right]$$

which results in:

$$P_3 = \gamma T_3 \quad \text{(Equation 2)}$$

While strictly speaking γ depends on the tri-mix concentration a, which in turn depends on P3 and T3, and appears to make the equation circular, the value of a is nominally about, for example, 0.1 (as is the value of r). As a practical matter, in general the value of a (and r) may be assumed to be 0.1 without significantly changing the value of γ so that, for the purpose of adding the tri-mix, γ is a constant that may be determined based upon P1, P2, T1, T2 and the chamber and pipe volumes once P2 and T2 have been measured. In some embodiments, however, the values of a and r may be selected by the laser user if desired.

Equation 2 thus determines when point 3 is reached, i.e., when the appropriate amount of tri-mix gas has been added to the chambers. Given the preferably continuous measurement of P3 and T3, the only calculation to be done to determine when point 3 on FIG. 3 is reached is a simple multiplication during the addition of the tri-mix, so that the refill process is not slowed down by computation time.

Thus, as stated above, at this point 3 after step 205, each of the laser chambers will contain the desired concentration of fluorine to a high degree of accuracy, but will have a higher pressure than the target pressure. Thus, gas from the chambers is bled to arrive at the desired target pressure. Again, this is done in two stages.

First, a fast bleed of gas from the chambers is done by opening the chamber valves (step 206 in FIG. 2). It is intended that this fast bleed remove a significant portion of the excess gas, but without dropping the pressure below the target pressure. In one embodiment, the chamber valves are opened for a predetermined amount of time, as this will be more easily tracked than the actual pressure, and which will reduce the pressure in the chambers by a predetermined amount that is dependent upon the flow rate of the chamber valves. For example, in some excimer lasers, opening the chamber valves for about half a second will reduce the pressure in the chambers by approximately 5 kPa. One of skill in the art will be able to select a suitable time to open the chamber valves, so that much of the excess pressure is relieved without going below the target pressure.

Once this is done, the chamber valves are closed and the injection valves opened, and a slower bleed of gas from the chambers continues through the injection valves (step 207 of FIG. 2). The pressure is monitored, and the injection valves left open until the desired target pressure is reached.

At this point, the laser chambers contain the desired target concentration of fluorine and target pressure of gas. As above, the refill is typically followed by an optimization process in which the laser is then test fired and the gas further adjusted based upon the observed operating parameters. Certain techniques of gas optimization are well known in the art.

A derivative sensitivity analysis was run to determine the refill accuracy of the tri-mix gas ratio a that might be obtained by the described method, given certain assumptions about the errors possible in measuring the pressure, temperature and volumes in Equation 2 above. The following nominal values and accuracy were used:

| Term | Nominal Value |
|---|---|
| $P_1$ | 20 ± 0.1 kPa |
| $P_2$ | 350 ± 0.1 kPa |
| $P_3$ | 390 ± 0.1 kPa |
| $T_1$ | 65 ± 0.5° C. |
| $T_2$ | 65 ± 0.5° C. |
| $T_3$ | 65 ± 0.5° C. |
| $V_c$ | 36 ± 0.5 L |
| $V_p$ | 0.5 ± 0.05 L |

Using a value of 0.1 for both (a) and r, the error contribution of measurement errors of pressure and chamber and pipe volumes were 0.33%, 0.02%, and 0.12% respectively, while the contribution of errors in temperature measurement was 1.83%. Summed in quadrature, this gives a total possible error of 1.92%.

These calculations thus show that an automatic refill process according to the described method can obtain a ratio of tri-mix to chamber gas to an accuracy that is difficult to accomplish with prior refill processes. In addition, such a refill process does not require further adjustment by an engineer before test firing and optimization, and, when properly done, results in a very low amount of excess gas that must be bled from the laser chambers.

The disclosed system and method has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that, while the preferred embodiment is a master oscillator-power amplifier multi-chambered excimer or molecular fluorine gas discharge laser system ("MOPA") the system may also be configured to have other oscillator/amplifier configurations, such as a master oscillator-power oscillator ("MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to cover any such oscillator stage and the term amplifier chamber or stage is broad enough to cover any such amplifier stage. Further, while the above description uses a two stage or chamber laser as an example, the system and method disclosed might also be applied to a single chamber laser or any multi-chamber laser.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
   a master oscillator having a laser chamber containing a lasing medium as comprising a halogen;
   an amplifier having a laser chamber containing a lasing medium gas comprising a halogen;
   a gas refill system including a controller automatically executing a refill scheme, the refill scheme comprising in sequence the steps of:
   obtaining a target pressure and a target concentration of halogen for a selected one of the laser chambers;
   evacuating the selected laser chamber to a first point at which the gas pressure in the chamber reaches a predetermined low value, and measuring the temperature and pressure at the first point;
   adding an amount of non-halogen containing gas to the selected laser chamber to reach a second point and measuring the temperature and pressure at the second point;
   adding an amount of halogen containing as to the selected laser chamber such that the gas in the selected laser chamber reaches the target concentration of halogen at a pressure greater than the target pressure; and
   bleeding gas from the selected laser chamber until the target pressure is reached.

2. The dual chamber gas discharge laser light source of claim 1 wherein the halogen comprises fluorine.

3. The dual chamber gas discharge laser light source of claim 1 wherein evacuating the selected laser chamber such that the gas pressure in each chamber reaches a predetermined low value further comprises evacuating each chamber to a pressure of approximately 20 kPa.

4. The dual chamber gas discharge laser light source of claim 1 wherein the amount of non-halogen containing gas added to the selected laser chamber is based at least in part on the target pressure and a comparison of a concentration of halogen in the halogen containing gas to the target concentration.

5. The dual chamber gas discharge laser light source of claim 1 wherein the laser chambers of both the master oscillator and amplifier have fill pipes for adding gas to the laser chambers, and wherein the amount of halogen containing gas added to the selected laser chamber is calculated at least in part based upon the temperature and pressure at the first and second points, and the volume of the selected laser chamber and the volume of the fill pipe for the selected laser chamber.

6. The dual chamber gas discharge laser light source of claim 5 wherein the amount of halogen containing gas added to the selected laser chamber is further calculated in part based upon the gas remaining in the selected laser chamber and the fill pipe for the selected laser chamber from prior operation of the laser.

7. The dual chamber gas discharge laser light source of claim 1 wherein each laser chamber has a first valve for adding as to or removing gas from the chamber at a first rate, and a second valve for adding gas to or removing gas from the chamber at a second rate which is slower than the first rate, and bleeding gas from the selected laser chamber until the target pressure is reached comprises:
   opening the first valve to remove a first quantity of gas from the laser chamber that results in a pressure in the laser chamber that is greater than the target pressure; and
   opening the second valve to remove a second quantity of gas from the laser chamber to reduce the pressure in the laser chamber to the target pressure.

8. The dual chamber gas discharge laser light source of claim 7 wherein opening the first valve to remove as first quantity of as from the selected laser chamber further comprises opening the first valve for a fixed amount of time.

9. The dual chamber gas discharge laser light source of claim 1 wherein each laser chamber has a first valve for adding gas to or removing gas from the chamber at a first rate, and a second valve for adding gas to or removing as from the chamber at a second rate which is slower than the first rate, and adding an amount of non-halogen containing gas to the selected laser chamber to reach a second point comprises:
   adding a first portion of the amount of non-halogen containing gas through the second valve; and
   adding the remaining portion of the amount of non-halogen containing gas through the first valve.

10. The dual chamber gas discharge laser light source of claim 1 wherein the laser light source is an excimer laser source.

11. The dual chamber gas discharge laser light source of claim 1 wherein obtaining a target pressure and concentration of halogen for a selected one of the laser chambers further comprises retrieving stored values for the target pressure and concentration.

12. The dual chamber gas discharge laser light source of claim 1 wherein obtaining a target pressure and concentration of halogen for a selected one of the laser chambers further comprises receiving as an input a selection of the target pressure and concentration.

13. A method of automatically refilling the gas in a laser chamber of a dual chamber gas discharge laser light source having a master oscillator and an amplifier, each of the master oscillator and amplifier having a laser chamber containing a lasing medium gas comprising a halogen, the method comprising in sequence the steps of:
   receiving in a controller a target pressure and a target concentration of halogen for a selected one of the laser chambers;
   directing, by the controller, evacuating the selected laser chamber to a first point at which the gas pressure in the chamber reaches a predetermined low value, and measuring the temperature and pressure at the first point;
   directing, by the controller, adding an amount of non-halogen containing gas to the selected laser chamber to reach a second point and measuring the temperature and pressure at the second point;
   directing, by the controller, adding an amount of halogen containing gas to the selected laser chamber such that the gas in the selected laser chamber reaches the target concentration of halogen at a pressure greater than the target pressure; and
   directing, by the controller, bleeding gas from the selected laser chamber until the target pressure is reached.

14. The method of automatically refilling gas of claim 13 wherein the halogen comprises fluorine.

15. The method of automatically refilling gas of claim 13 wherein directing evacuating the selected laser chamber such that the gas pressure in each chamber reaches a predetermined low value further comprises directing evacuating the selected laser chamber to a pressure of approximately 20 kPa.

16. The method of automatically refilling gas of claim 13 wherein directing adding an amount of non-halogen containing gas to the selected laser chamber further comprises determining by the controller an amount of non-halogen gas to be added based at least in part on the target pressure and a comparison of a concentration of halogen in the halogen containing gas to the target concentration.

17. The method of automatically refilling as of claim 13 wherein the laser chambers of both the master oscillator and amplifier have fill pipes for adding gas to the laser chambers, and wherein directing adding an amount of halogen containing gas to the selected laser chamber further comprises determining by the controller an amount of halogen gas to be added at least in part based upon the temperature and pressure at the first and second points, and the volume of the selected laser chamber and the volume of the fill pipe for the selected laser chamber.

18. The method of automatically refilling as of claim 17 further comprising determining by the controller the amount of halogen containing gas to be added to the selected laser chamber in part based upon the gas remaining in the selected laser chamber and the fill pipe for the selected laser chamber from prior operation of the laser.

19. The method of automatically refilling as of claim 13 wherein each laser chamber has a first valve for adding gas to or removing gas from the chamber at a first rate, and a second valve for adding as to or removing gas from the chamber at a second rate which is slower than the first rate, and directing bleeding gas from the selected laser chamber until the target pressure is reached further comprises:
   directing, by the controller, opening of the first valve to remove a first quantity of gas from the laser chamber that results in a pressure in the laser chamber that is greater than the target pressure; and
   directing, by the controller, opening of the second valve to remove a second quantity of gas from the laser chamber to reduce the pressure in the laser chamber to the target pressure.

20. The method of automatically refilling gas of claim 19 wherein directing opening the first valve to remove a first quantity of as from the laser chamber further comprises directing opening the first valve for a fixed amount of time.

21. The method of automatically refilling gas of claim 13 wherein each laser chamber has a first valve for adding gas to or removing as from the chamber at a first rate, and a second valve for adding gas to or removing gas from the chamber at a second rate which is slower than the first rate, and directing adding an amount of non-halogen containing gas to the selected laser chamber to reach a second point further comprises:
   directing, by the controller, adding a first portion of the amount of non-halogen containing gas through the second valve; and
   directing, by the controller, adding the remaining portion of the amount of non-halogen containing gas through the first valve.

22. The method of automatically refilling gas of claim 13 wherein the laser light source is an excimer laser source.

23. The method of automatically refilling gas of claim 13 wherein receiving in the controller a target pressure and concentration of halogen for a selected one of the laser chambers further comprises retrieving by the controller stored values for the target pressure and concentration.

24. The method of automatically refilling gas of claim 13 wherein receiving in the controller a target pressure and concentration of halogen for a selected one of the laser chambers further comprises receiving by the controller as an input a selection of the target pressure and concentration.

25. A non-transitory computer-readable medium having stored thereon a program, the program being executable by a processor to perform a method of automatically refilling the gas in a laser chamber of a dual chamber gas discharge laser light source having a master oscillator and an amplifier, each of the master oscillator and amplifier having a laser chamber containing a lasing medium gas comprising a halogen, the method comprising in sequence the steps of:
   receiving in a controller a target pressure and a target concentration of halogen for a selected one of the laser chambers;
   directing, by the controller, evacuating the selected laser chamber to a first point at which the gas pressure in the chamber reaches a predetermined low value, and measuring the temperature and pressure at the first point;
   directing, by the controller, adding an amount of non-halogen containing gas to the selected laser chamber to reach a second point and measuring the temperature and pressure at the second point;
   directing, by the controller, adding an amount of halogen containing gas to the selected laser chamber such that the gas in the selected laser chamber reaches the target concentration of halogen at a pressure greater than the target pressure; and
   directing, by the controller, bleeding gas from the selected laser chamber until the target pressure is reached.

* * * * *